US011139660B2

United States Patent
(12) United States Patent
Wang et al.

(10) Patent No.: US 11,139,660 B2
(45) Date of Patent: Oct. 5, 2021

(54) SYSTEMS AND METHODS FOR BATTERY MANAGEMENT

(71) Applicant: SZ DJI TECHNOLOGY CO., LTD., Shenzhen (CN)

(72) Inventors: Wentao Wang, Shenzhen (CN); Dayang Zheng, Shenzhen (CN); Lei Wang, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 90 days.

(21) Appl. No.: 16/246,656

(22) Filed: Jan. 14, 2019

(65) Prior Publication Data

US 2019/0148951 A1 May 16, 2019

Related U.S. Application Data

(63) Continuation of application No. PCT/CN2016/089821, filed on Jul. 12, 2016.

(51) Int. Cl.

| | |
|---|---|
| ***H02J 7/00*** | (2006.01) |
| ***B60L 53/62*** | (2019.01) |
| ***B60L 53/66*** | (2019.01) |
| ***B60L 53/30*** | (2019.01) |
| *H01M 10/42* | (2006.01) |

(52) U.S. Cl.

CPC .......... *H02J 7/0014* (2013.01); *B60L 53/305* (2019.02); *B60L 53/62* (2019.02); *B60L 53/66* (2019.02); *H02J 7/00* (2013.01); *H02J 7/0026* (2013.01); *H02J 7/00036* (2020.01); *B60L 2200/10* (2013.01); *H01M 10/4257* (2013.01)

(58) Field of Classification Search

CPC ........................................................ H02J 7/00

See application file for complete search history.

(56) References Cited

U.S. PATENT DOCUMENTS

| | | | | |
|---|---|---|---|---|
| 7,227,333 B2 * | 6/2007 | Yamada | ................ | H01M 10/46 320/106 |
| 2015/0158392 A1 * | 6/2015 | Zhao | ..................... | H02J 7/0026 320/109 |
| 2016/0149421 A1 * | 5/2016 | White | ................... | H02J 7/0021 320/121 |
| 2017/0163060 A1 * | 6/2017 | Zheng | ................... | H02J 7/0014 |

FOREIGN PATENT DOCUMENTS

| | | |
|---|---|---|
| CN | 1499215 A | 5/2004 |
| CN | 102097844 A | 6/2011 |
| CN | 105610215 A | 5/2016 |

OTHER PUBLICATIONS

The World Intellectual Property Organization (WIPO) International Search Report and Written Opinion for PCT/CN2016/089821 dated Apr. 17, 2017 7 Pages.

* cited by examiner

*Primary Examiner* — Robert Grant
(74) *Attorney, Agent, or Firm* — Anova Law Group, PLLC

(57) ABSTRACT

A method for managing a battery includes exchanging battery data between the battery and an onboard battery management system (BMS) of a mobile platform and between the battery and a charger BMS of a battery charger, and managing the battery based on the battery data.

18 Claims, 19 Drawing Sheets

Smart battery system 100

SYSTEMS AND METHODS FOR BATTERY MANAGEMENT

CROSS-REFERENCE TO RELATED APPLICATION

This application is a continuation of International Application No. PCT/CN2016/089821, filed on Jul. 12, 2016, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

The disclosed embodiments relate generally to battery technology and more particularly, but not exclusively, to methods and systems for battery management on a mobile platform.

BACKGROUND

Mobile platforms, such as unmanned aerial vehicles (UAV), can be powered using smart batteries that can manage battery charging and discharging. In many instances, a mobile platform can use multiple smart batteries to provide sufficient operating power to the mobile platform. Using multiple smart batteries, however, has multiple disadvantages, including being: (1) overly costly; (2) taking up too much space on the mobile platform; and (3) weighing down the mobile platform, thereby increasing power consumption. Furthermore, multiple smart batteries can include redundant battery management systems that are not optimized for interoperability and load balancing among the multiple smart batteries. Additionally, if the mobile platform loses connection with the smart batteries, the loss of power data can cause unreliable mobile platform operation.

In view of the foregoing, there is a need for methods and systems for battery management aboard mobile platforms overcome the disadvantages of currently methods and systems.

SUMMARY

In accordance with a first aspect disclosed herein, there is set forth a method for managing a battery, comprising: exchanging battery data between the battery and an onboard battery management system (BMS) of a mobile platform and between the battery and a charger BMS of a battery charger; and managing the battery based on the battery data.

In accordance with another aspect disclosed herein, there is set forth a system for managing charging and discharging of a battery, comprising: a mobile platform comprising an onboard battery management system (BMS); and a battery charger comprising a charger BMS, wherein the onboard BMS and the charger BMS are configured to: exchange battery data with the battery; and manage the battery based on the battery data.

In accordance with another aspect disclosed herein, there is set forth a method for managing a battery of a mobile platform, comprising: transmitting first initial battery data from a storage device of the battery to an onboard battery management system (BMS) of the mobile platform; receiving first updated battery data from the onboard BMS at the storage device; transmitting second initial battery data from the storage device to a charger BMS of a battery charger; and receiving second updated battery data from the charger BMS at the storage device.

In accordance with another aspect disclosed herein, there is set forth a battery, comprising: a plurality of battery cells; a storage device configured to store battery data of the battery; and a battery-interface configured to: transmit first initial battery data from a storage device of the battery to an onboard battery management system (BMS) of the mobile platform; receive first updated battery data from the onboard BMS at the storage device; transmit second initial battery data from the storage device to a charger BMS of a battery charger; and receive second updated battery data from the charger BMS at the storage device.

In accordance with another aspect disclosed herein, there is set forth a method for managing discharging of a battery to power a mobile platform, comprising: obtaining initial battery data from a storage device of the battery; managing discharging of the battery using an onboard battery management system (BMS) of the mobile platform based on the initial battery data; and transmitting updated battery data from the onboard BMS to the storage device.

In accordance with another aspect disclosed herein, there is set forth a mobile platform, comprising: an onboard battery management system (BMS) configured to: obtain initial battery data from a storage device of a battery; manage discharging of the battery based on the initial battery data; and transmit updated battery data to the storage device.

In accordance with another aspect disclosed herein, there is set forth a method for managing charging of a battery using a battery charger, comprising: obtaining initial battery data from a storage device of the battery; managing charging of the battery using a charger battery management system (BMS) of the battery charger based on the initial battery data; and transmitting updated battery data from the charger BMS to the storage device.

In accordance with another aspect disclosed herein, there is set forth a battery charger, comprising: a charger battery management system (BMS) configured to: obtain initial battery data from a storage device of a battery; manage charging of the battery based on the initial battery data; and transmit updated battery data to the storage device.

In accordance with another aspect disclosed herein, there is set forth a method for managing discharging of a battery to power a mobile platform, comprising: transmitting initial battery data from the battery to an onboard battery management system (BMS) of the mobile platform; and managing discharging of the battery using the onboard BMS based on the initial battery data.

In accordance with another aspect disclosed herein, there is set forth a system for managing battery discharging, comprising: a battery; and a mobile platform, comprising: an onboard battery management system (BMS) configured to: obtain initial battery data from the battery; and managing discharging of the battery based on the initial battery data.

In accordance with another aspect disclosed herein, there is set forth a method for managing charging of a battery using a battery charger, comprising: transmitting initial battery data from the battery to a charger battery management system (BMS) of the battery charger; and managing charging of the battery using the charger BMS based on the initial battery data.

In accordance with another aspect disclosed herein, there is set forth a system for managing battery charging, comprising: a battery; and a battery charger comprising: a charger battery management system (BMS) configured to: obtain initial battery data from the battery; and manage charging of the battery based on the initial battery data.

DETAILED DESCRIPTION OF THE EMBODIMENTS

A battery typically includes multiple battery cells. Each battery cell can convert stored chemical energy into electrical energy to deliver desired voltage, current, capacity, or power density. A smart battery includes a battery management system (BMS) coupled to the battery cells. The BMS manages operations of the smart battery by performing a variety of selective battery cell switching and computation functions.

The present disclosure sets forth systems and methods for using a battery management system (BMS) aboard a mobile platform to provide power management and other functionality to batteries that power the mobile platform. The present systems and methods can advantageously provide integrated management, charging, and discharging of a plurality of batteries aboard the mobile platform. The present systems and methods thereby improve the efficiency and reliability of battery management aboard the mobile platform and/or other battery powered systems, overcoming disadvantages of prior systems and methods.

Figure 1:
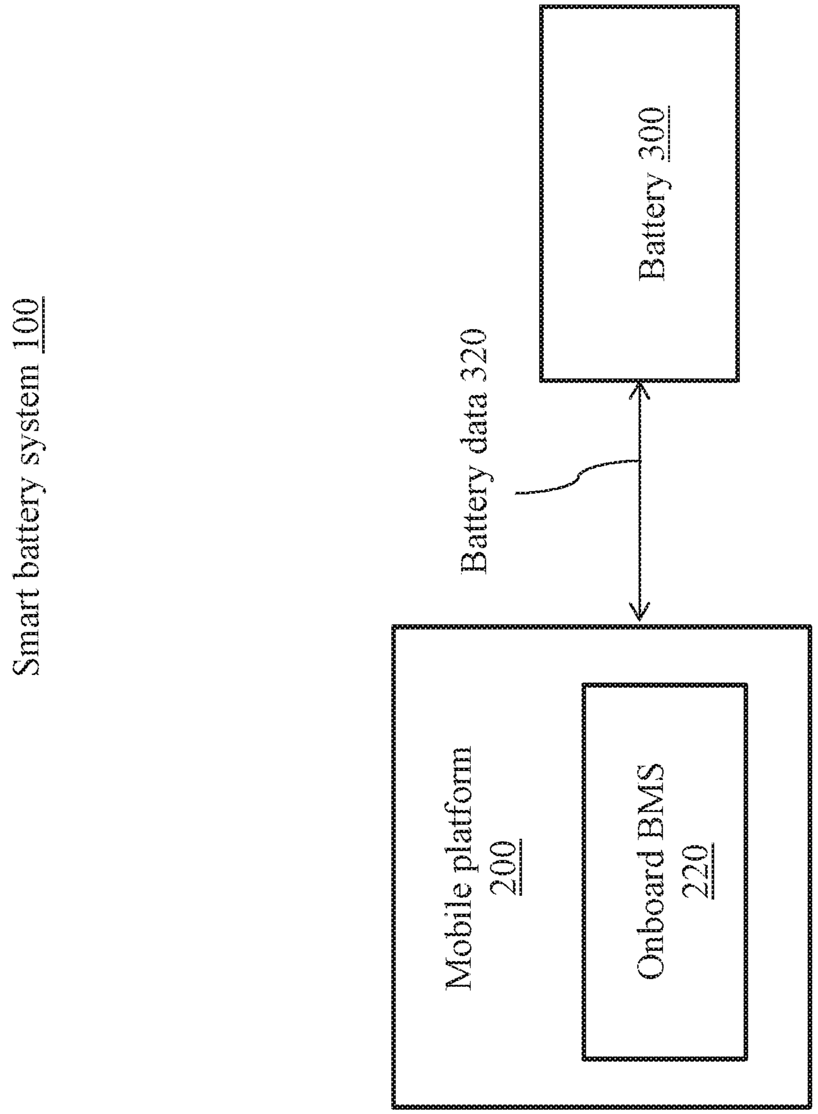
FIG. 1 is an exemplary diagram illustrating an embodiment of a smart battery system including a mobile platform and a battery.

Turning now to FIG. 1, an exemplary smart battery system 100 as including a mobile platform 200 coupled with a battery 300. Exemplary mobile platform 200 that are suitable for use with the present systems and methods include, but are not limited to, bicycles, automobiles, trucks, ships, boats, trains, helicopters, aircraft, various hybrids thereof, and the like. In some embodiments, the mobile platform 200 can be an unmanned aerial vehicle (UAV). Colloquially referred to as "drones," UAVs can include aircraft without a human pilot (or operator) onboard the vehicle whose flight is controlled autonomously or by a remote pilot (or sometimes both). UAVs can now find increased usage in civilian applications involving various aerial operations, such as data-gathering or delivery. The present systems and methods can be suitable for battery management on many types of UAVs including, without limitation, quadcopters (also referred to a quadrotor helicopters or quad rotors), single rotor, dual rotor, trirotor, hexarotor, and octorotor rotorcraft UAVs, fixed wing UAVs, and hybrid rotorcraft-fixed wing UAVs.

The battery 300 can be configured to deliver a predetermined voltage, current, capacity, and/or power density to the mobile platform 200. Although a single battery 300 is shown in FIG. 1 for illustrative purposes, the smart battery system 100 can include any number of batteries 300, as desired. In some embodiments, the battery 300 can be rechargeable. The battery 300 can include a predetermined number of battery modules 360 (shown in FIG. 4). Optionally, the battery modules 360 can be connected in series, parallel and/or a combination of both. Each of the battery modules 360 can include a predetermined number of battery cells 362 (shown in FIG. 4). Optionally, the battery cells 362 can be connected in series, parallel and/or a combination of both.

FIG. 1 shows the mobile platform 200 as including an onboard battery management system (BMS) 220. The onboard BMS 220 can be electrically connected with the battery 300, so that the battery 300 can be discharged to provide electric power to the mobile platform 200 as managed by the onboard BMS 220. The onboard BMS 220 can exchange battery data 320 with the battery 300 in a wired and/or wireless manner. Based on the battery data 320, the onboard BMS 220 can determine and/or calculate status of the battery 300 to manage discharging of the battery 300.

Figure 2:
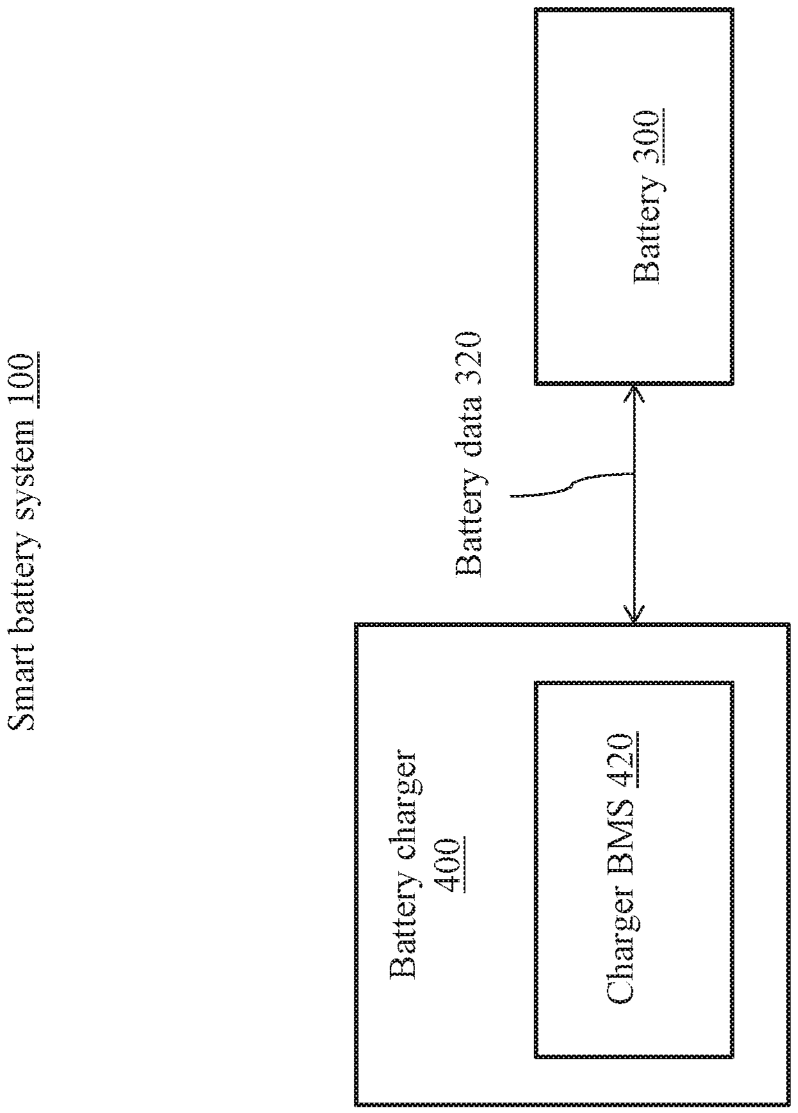
FIG. 2 is another exemplary diagram illustrating an embodiment of a smart battery system in accordance with the smart battery system of FIG. 1.

Turning to FIG. 2, another embodiment of the exemplary smart battery system 100 is shown. FIG. 2 shows the smart battery system 100 as including a battery charger 400 coupled with the battery 300. FIG. 2 shows the battery charger 400 as including a charger BMS 420. The charger BMS 420 can be electrically connected with the battery 300, so that the battery 300 can be charged by the battery charger 400 via the charger BMS 420. The charger BMS 420 can exchange the battery data 320 with the battery 300 in a wired and/or wireless manner. Based on the battery data 320, the charger BMS 420 can determine and/or calculate the status of the battery 300 to manage charging of the battery 300.

Figure 3:
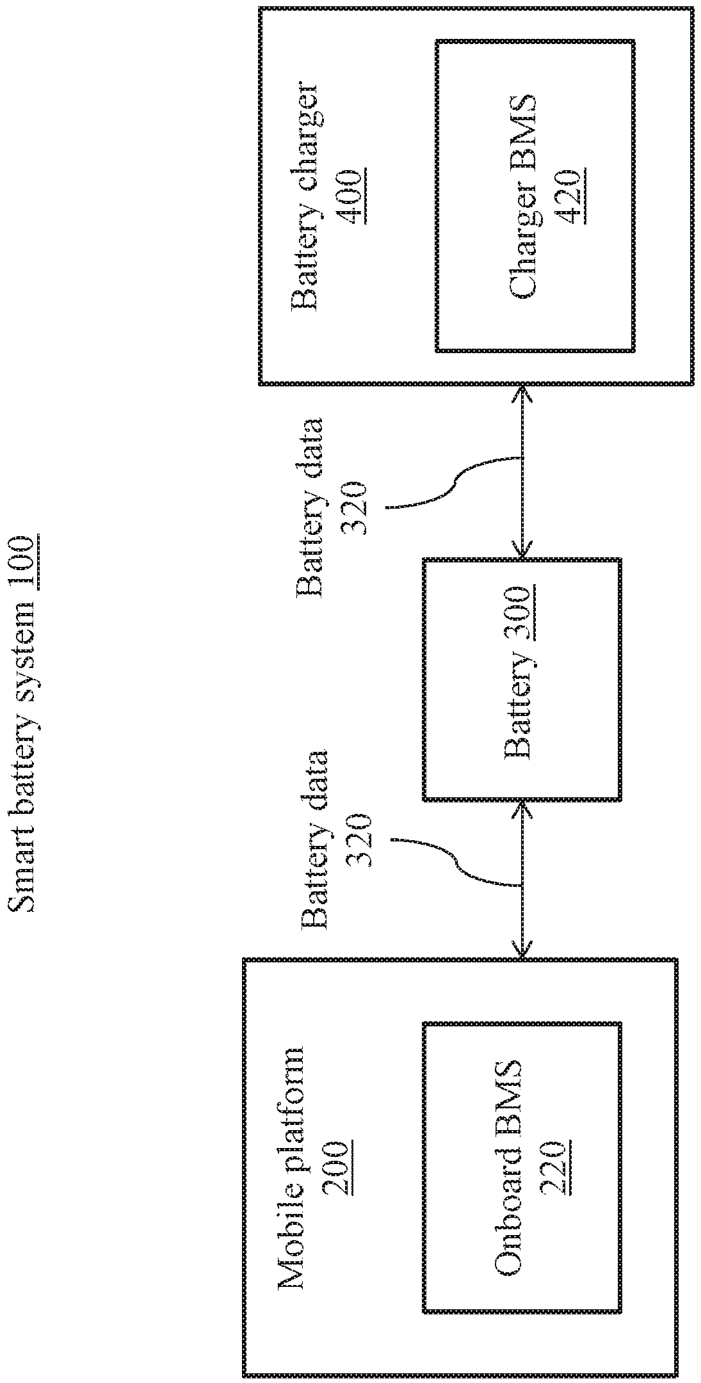
FIG. 3 is yet another exemplary diagram illustrating an embodiment of a smart battery system in accordance with the smart battery system of FIG. 1.

Turning to FIG. 3, another alternative embodiment of the smart battery system 100 is shown. FIG. 3 shows the smart battery system 100 as including the mobile platform 200 and the battery charger 400. At least one of the mobile platform 200 and the battery charger 400 can be coupled with the battery 300. The battery 300 can exchange the battery data 320 with the onboard BMS 220 and/or with the charger BMS 420.

Although FIG. 3 shows both of the mobile platform 200 and the battery charger 400 being coupled with the battery 300 for illustrative purposes only, the mobile platform 200 and the battery charger 400 can be coupled with the battery 300 simultaneously and/or sequentially, without limitation. For example, the battery 300 can be installed onboard the mobile platform 200 during an operation of the mobile platform 200. The battery 300 can be removed and/or disconnected from the mobile platform 200 to be connected with the battery charger 400 for charging.

Figure 4:
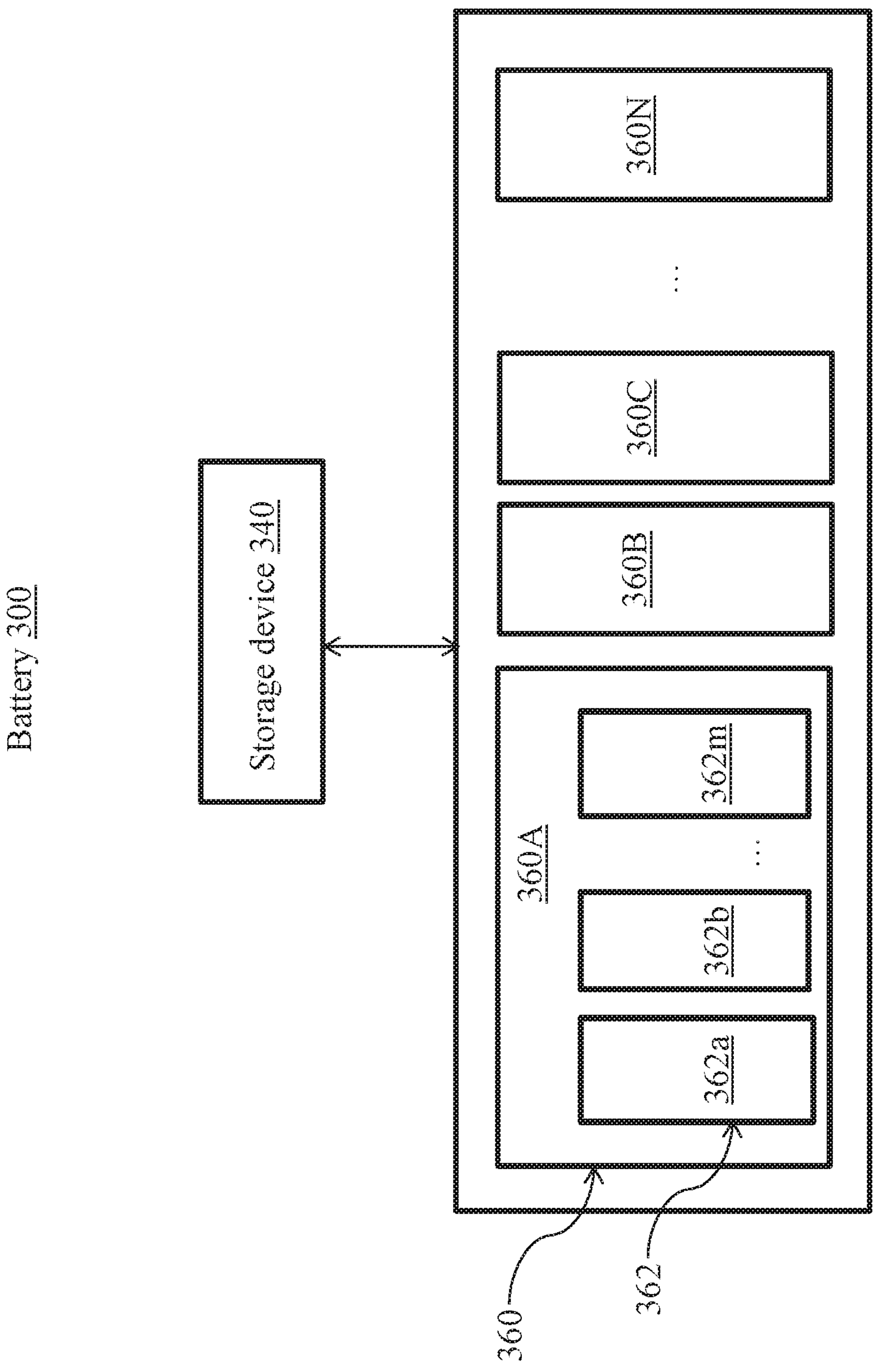
FIG. 4 is exemplary diagram illustrating an embodiment of a battery in the smart battery systems described herein.

Turning to FIG. 4, the battery 300 is shown to include one or more battery modules 360A-360N. The battery modules 360A-360N can be uniform and/or different. FIG. 4 shows the battery module 360A as including one or more battery cells 362*a*-362*m*. The battery cells 362*a*-362*m* can be uniform and/or different. The 362*a*-362*m* can include any type of battery cells, including, but not limited to, lead-acid cells, lithium air cells, lithium-ion cells, nickel-cadmium cells, nickel-metal hydrogen cells, and/or the like. At least one of the battery cells 362*a*-362*m* can be rechargeable.

Although FIG. 4 shows one battery module 360A as including the battery cells 362*a*-362*m* for illustrative purposes only, each of the battery modules 360A-360N can include any number of uniform and/or different battery cells 362, without limitation. The number of battery cells 362 of the battery modules 360A-360N can be uniform and/or different.

FIG. 4 shows the battery 300 as including a storage device 340. The storage device 340 can be used for storing the battery data 320 (shown in FIGS. 1-3) received at the battery 300. An exemplary storage device 340 can include non-volatile memory, such as one or more magnetic disk storage devices, flash memory devices, and/or other non-volatile solid-state memory devices. Additionally and/or alternatively, the storage device 340 can include a random access memory (RAM), static RAM, dynamic RAM, non-volatile random-access memory (NVRAM), ferroelectric memory, read-only memory (ROM), programmable ROM, erasable programmable ROM, electrically erasable programmable ROM (EEPROM), flash memory, secure digital (SD) card, or a combination thereof. Although one storage device 340 is shown in FIG. 4, the battery 300 can include any number of uniform and/or different storage devices 340, without limitation.

Figure 5:
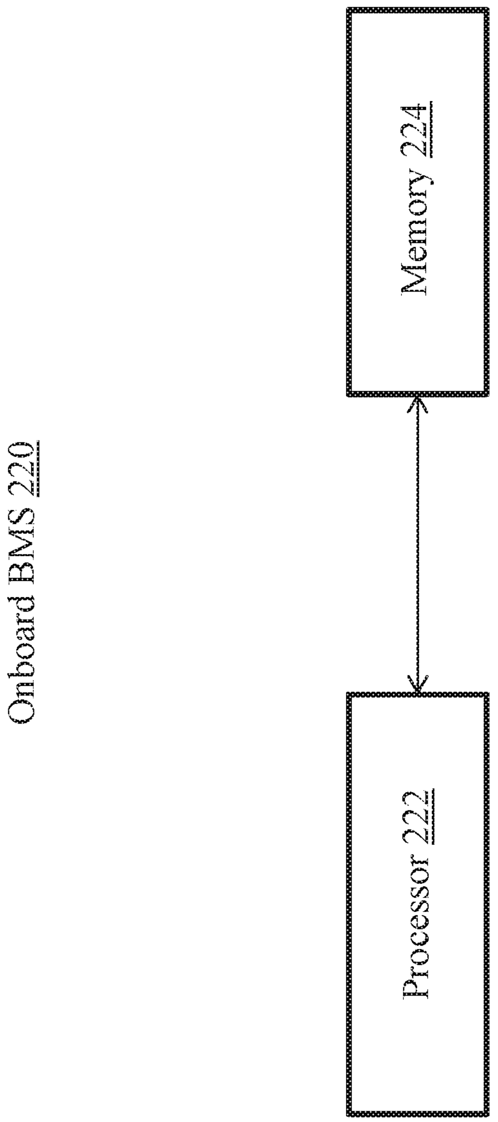
FIG. 5 is exemplary diagram illustrating an embodiment of an onboard BMS in the smart battery systems described herein.

Turning to FIG. 5, an exemplary onboard BMS 220 is shown. The onboard BMS 220 can include a processor 222. The processor 222 can be programmed or otherwise configured for performing data acquisition, data processing, and/or any other functions and operations described herein for managing the battery 300. Without limitation, the processor 222 can include one or more general purpose microprocessors (for example, single and/or multi-core processors), application-specific integrated circuits, application-specific instruction-set processors, physics processing units, digital signal processing units, coprocessors, network processing units, encryption processing units, and/or the like. Although described as including a single processor 222 for purposes of illustration only, the onboard BMS 220 can include any suitable number of uniform and/or different processor 222.

An exemplary processor 222 can incorporate the functions of a central processing unit (CPU) implemented on one or more integrated circuits. For example, the processor 222 can include an arithmetic logic unit (ALU) and/or a control logic section. The ALU can perform operations such as mathematical calculations and logic operations such as AND or OR. The control logic section can retrieve instruction operation codes from a memory 224 and initiate a sequence of operations of the ALU required to carry out the instruction. Thus, the processor 222 can be a multipurpose and/or programmable device that accepts the battery data 320 (shown in FIG. 2), processes the battery data 320, and provides results as output.

Additionally and/or alternatively, the processor 222 can be coupled with one or more switch devices (not shown). The processor 222, for example, can generate one or more control signals (not shown) for actuating the switch devices. The switch devices can be selectively turned on/off according to the control signals. For example, a selected control signal can be provided to two or more of the switch devices, and/or a selected switch device can receive two or more of the control signals.

An exemplary switch device can include a solid-state switch and/or a solid-state relay each including one or more semiconductor devices. Exemplary semiconductor devices can include diodes, thyristors, and/or transistors such as bipolar transistors or metal-oxide-semiconductor field-effect transistors (MOSFETs). A selected switch device can be used for switching on and/or off selected terminals of the battery module 360 (shown in FIG. 4) and/or of the battery cell 362 (shown in FIG. 4). Thus, the switches can selectively connect the battery module 360 and/or the battery cells 362 in series, parallel and/or a combination of both, for the battery 300 to deliver a predetermined voltage, current, capacity, and/or power density.

The processor 222 can be coupled directly with the switch devices and/or indirectly via one or more intermediate system components of the battery management system 100. Exemplary intermediate system components can include one or more driver circuits (not shown) for boosting the control signals generated by the processor 222. Additionally and/or alternatively, the driver circuit can isolate the ALU and/or control logic section from the switch devices, detect malfunctions, store and report failures to the processor 222, serving as a precaution against failure and/or creating auxiliary voltages. Optionally, the processor 222 can be at least partially integrated with one or more of the switch devices.

FIG. 5 shows the onboard BMS 220 as including a memory 224. The processor 222 can run (and/or execute) various software programs and/or sets of instructions stored in the memory 224 to perform various functions of the onboard BMS 220. The memory 120 can include any (non-transitory) computer-readable storage medium. An exemplary memory 224 can be provided in a similar manner as the storage device 340 (shown in FIG. 4). The processor 222 can communicate with the memory 224, for example, wirelessly and/or using hardware connectors and buses. Although one memory 224 is shown in FIG. 5, the onboard BMS 220 can include any number of uniform and/or different memories 224.

Figure 6:
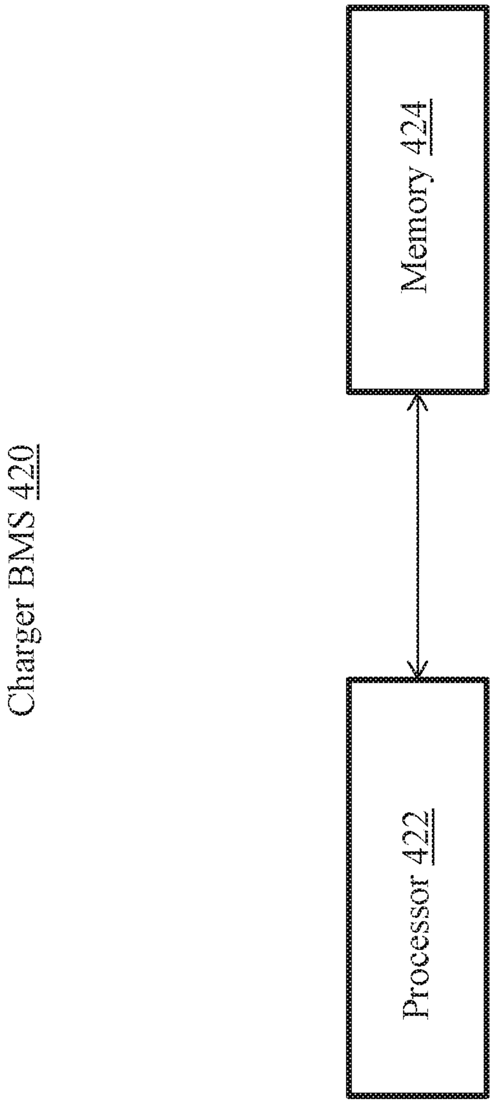
FIG. 6 is exemplary diagram illustrating an embodiment of a charger BMS in the smart battery systems described herein.

Turning to FIG. 6, an exemplary charger BMS 420 is shown. The charger BMS 420 can include a processor 422 and/or a memory 424. An exemplary processor 422 can be provided in a similar manner as the processor 222 (shown in FIG. 5). An exemplary memory 424 can be provided in a similar manner as the memory 224 (shown in FIG. 5). The processor 422 can run (and/or execute) various software programs and/or sets of instructions stored in the memory 424 to perform various functions of the charger BMS 420.

Figure 7:
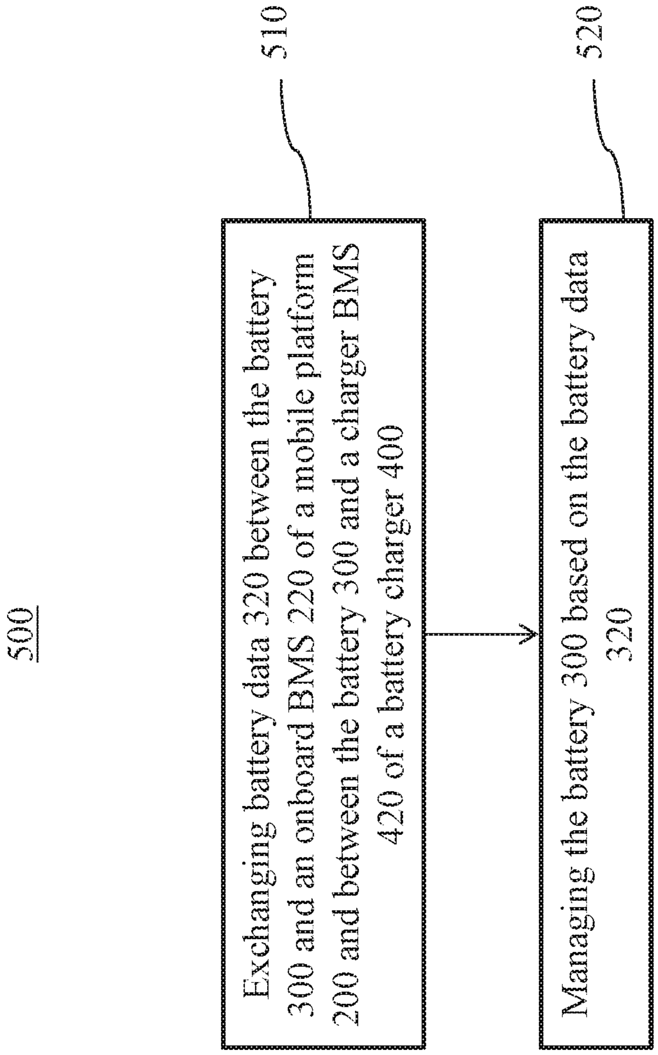
FIG. 7 is an exemplary top-level flow chart illustrating an embodiment of a method for managing the smart battery systems described herein.

Turning to FIG. 7, an exemplary method 500 for managing the battery 300 is shown. Battery data 320 are exchanged, at 510, between the battery 300 and the onboard BMS 220 of the mobile platform 200 and between the battery 300 and the charger BMS 420 of the battery charger 400. The battery 300 is managed, at 520, based on the battery data 320. In some embodiments, the mobile platform 200 can manage the battery 300 based on the battery data 320 exchanged between the battery 300 and the onboard BMS 220. The battery charger 400 can manage the battery 300 based on the battery data 320 exchanged between the battery 300 and the charger BMS 420.

The method 500 can overcome disadvantages of existing mobile platforms that use one or more smart battery. For example, a typical BMS can be expensive, which results in high cost of a smart battery. The BMS has large volume and heavy weight, so travel time of a mobile platform using a smart battery can be shortened. The BMS can consume electrical power and thus waste capacity of a smart battery. Further, controlling of a mobile platform needs battery data obtained from the BMS of the smart battery. To ensure reliability of communication between the mobile platform and the BMS, a plurality of smart batteries (for example, greater than three smart batteries) need to be situated on the mobile platform, with each smart battery including a BMS. Such redundancy can increase cost of operating the mobile platform, while performance of the mobile platform and the smart battery is not improved.

According to the method 500, the battery 300 does not require a BMS. The onboard BMS 220 and/or the charger BMS 420 can be located on the mobile platform 200 and the battery charger 400, respectively. Advantageously, cost of the battery 300 can be significantly reduced. Accordingly, the battery 300 can be configured to include more battery cells to increase capacity without significantly impacting cost. Adding the onboard BMS 220 can be achieved by expanding a control system of the mobile platform 200, and such expansion usually does not introduce significant weight increase and/or volume increase for the mobile platform 200, so travel time of the mobile platform 200 can be extended. In addition, electrical power consumed by the storage device 340 can be negligible, so capacity waste of the battery 300 can be significantly reduced.

Further, the onboard BMS 220 can process the battery data 320 on the mobile platform 200, so the problem of interrupted communication between a smart battery and the mobile platform can be circumvented. Safety and reliability of operating the mobile platform 200 can be advantageously improved. Still further, the smart battery system 100 shown in FIG. 3 can include two just BMS total. Compared with existing systems requiring multiple smart batteries each including a BMS, the total number of BMS can be reduced, resulting in reduced manufacturing cost.

Figure 8:
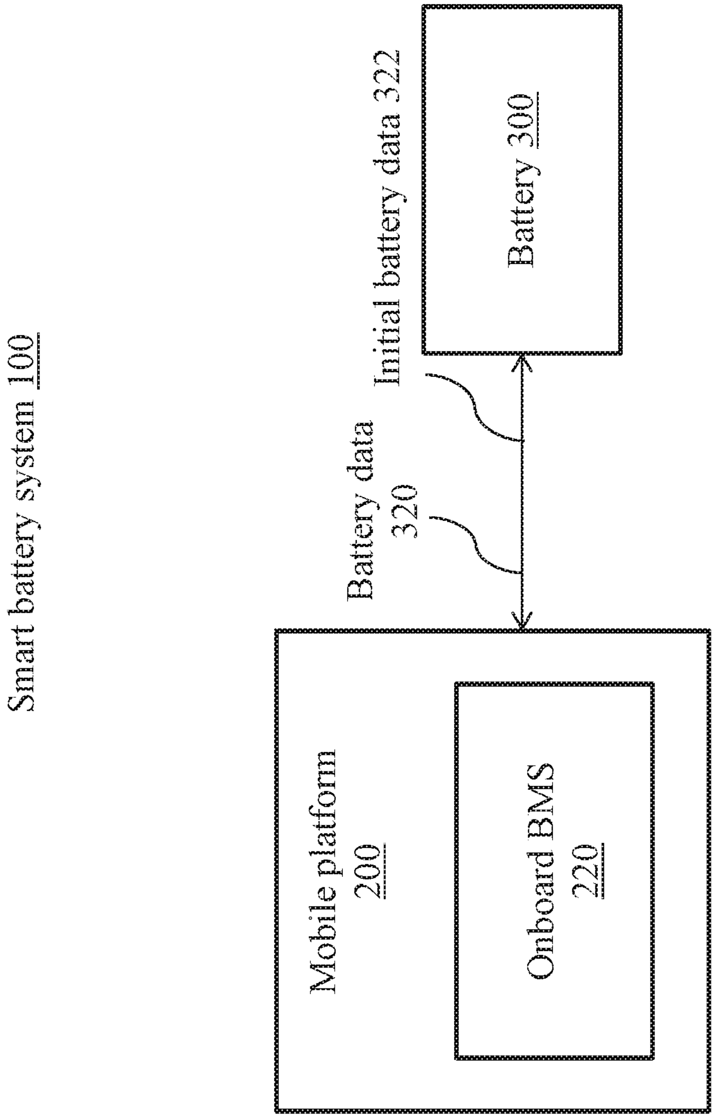
FIG. 8 is another exemplary diagram illustrating an embodiment of a smart battery system in accordance with the smart battery system of FIG. 1.

Turning to FIG. 8, the battery 300 is shown as transmitting initial battery data 322 to the mobile platform 200. In various embodiments, the initial battery data 322 can include battery data 320 that are stored on the battery 300 prior to discharging and/or charging. The battery 300 can transmit the initial battery data 320 to the onboard BMS 220. The onboard BMS 220 can use the initial battery data 320 for identifying the battery 300 and/or assessing status of the battery 300.

Exemplary initial battery data 322 can include identification and/or specification of the battery 300. Exemplary identification can include a unique identifier, serial number, model number, manufacturer, and/or manufacture date of the battery 300. Additionally and/or alternatively, the initial battery data 322 can include status (and/or operation parameters) of the battery 300. Exemplary status can include current capacity, maximum capacity, voltage, current, internal resistance, temperature, number of charge-discharge cycles, and/or remaining lifetime of the battery 300.

Figure 9:
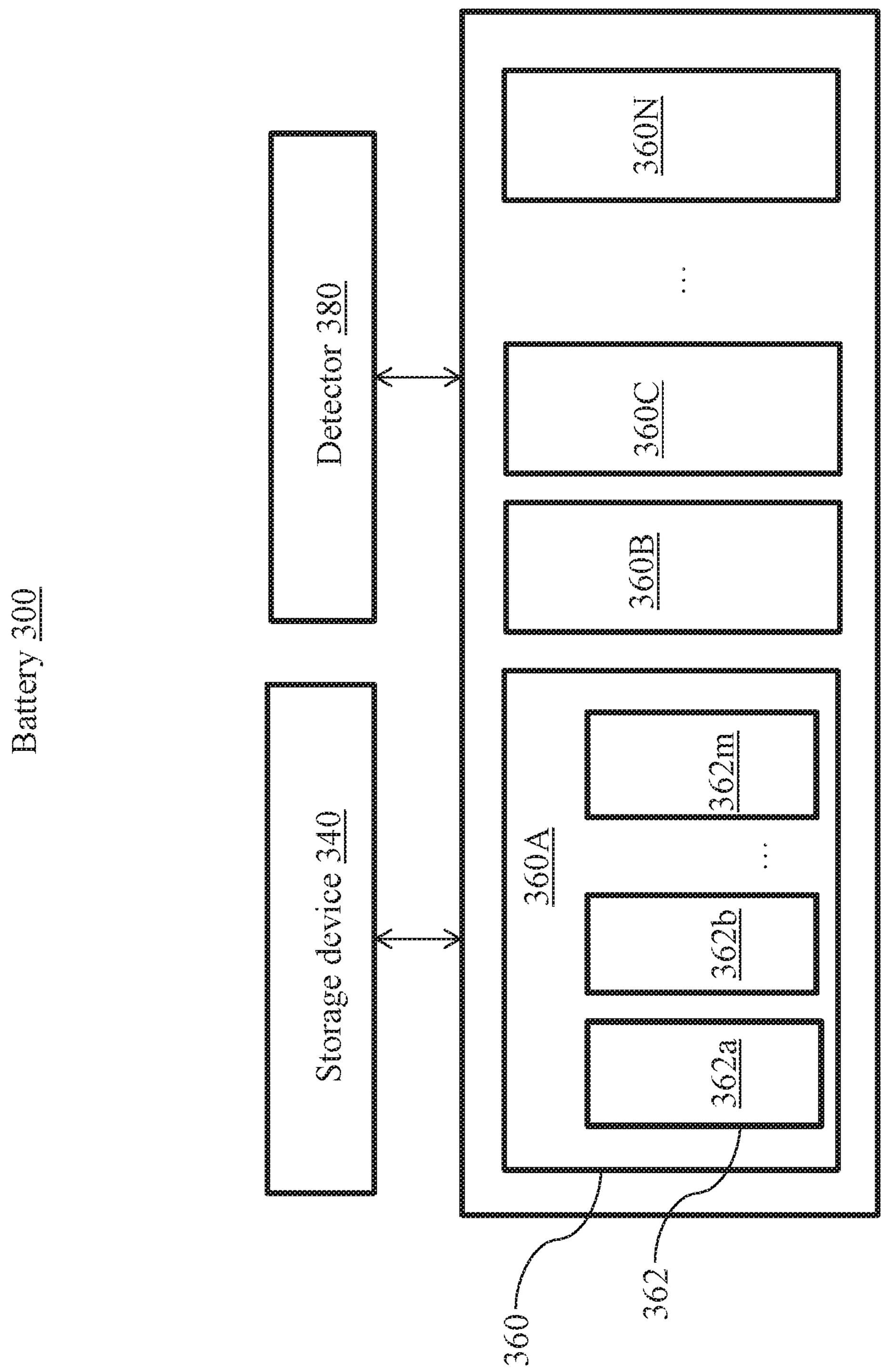
FIG. 9 is exemplary diagram illustrating an embodiment of the battery of FIG. 4, wherein the battery includes a detector.

Turning to FIG. 9, the battery 300 is shown as including at least one detector 380 coupled with the battery modules 360 and/or the battery cells 362. The detector 130 can include a sensor (not shown) for sensing a status of the battery 300. Exemplary status of the battery 300 can include the status of the battery modules 360, the battery cells 362, or a combination thereof. For example, the detector 130 can be used for sensing status such as current capacity, maximum capacity, voltage, current, internal resistance, temperature and/or remaining lifetime of the battery 300. Additionally and/or alternatively, the detector 130 can obtain other statuses associated with the battery 300. Exemplary statuses can include, but are not limited to, state of charge (SOC), depth of discharge (DOD), state of health (SOH), impedance, conductance, self-discharge, ability to accept a charge, and/or coolant flow if the battery 300 is air or fluid cooled.

When the battery 300 is in communication with the mobile platform 200 (shown in FIG. 1) during the discharging, the detector 130 can be in communication with the onboard BMS 220 (shown in FIG. 1). Upon being instructed by the onboard BMS 220, the detector 130 can collect the status of the battery 300 and transmit the same to the onboard BMS 220. Based on the status of the battery 300 collected by the detector 130, the onboard BMS 220 can perform any calculation needed for obtain the status of the battery 300. Thus, the onboard BMS 220 can monitor the status of the battery 300 during the discharging.

Although shown in FIG. 9 as including a single detector 130 for purposes of illustration only, the battery 300 can include any suitable number of uniform and/or different detectors 130. Additionally and/or alternatively, the detector 130 can be at least partially located on the mobile platform 200 and/or integrated with the onboard BMS 220. In that case, the detector 130 can measure certain parameters (such as current and/or voltage) via electrical connection with the battery 300 when the battery 300 is coupled with the mobile platform 200.

Figure 10:
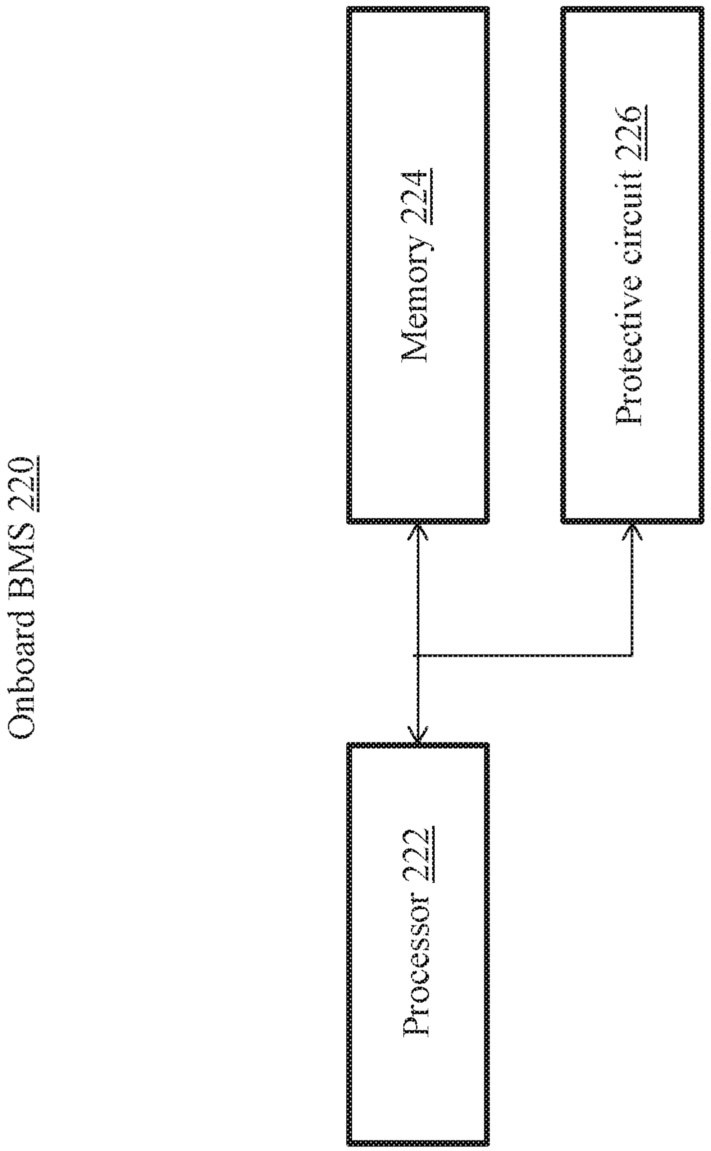
FIG. 10 is exemplary diagram illustrating an embodiment of the onboard BMS of FIG. 5, wherein the onboard BMS includes a protective circuit.

Turning to FIG. 10, the onboard BMS 220 is shown as including a protective circuit 226 in communication with the processor 222. In some embodiments, the protective circuit 226 can be at least partially integrated with the processor 222. Exemplary protective circuit 226 can include one or more switch devices (not shown) triggered by control signals (not shown) from the processor 222.

The protective circuit 226 can protect the battery 300 during discharging upon detection of an abnormal battery status. For example, upon detection of the abnormal battery status of the battery modules 360 (shown in FIG. 4) and/or the battery cells 362 (shown in FIG. 4), the protective circuit 226 can selectively disconnect, isolate, and/or bypass the battery module 360, the battery cell 362, and/or the battery 300. Advantageously, safety of discharging the battery 300 can be improved.

An abnormal battery status can include any out-of-tolerance ambient and/or operating conditions that can result in failure of the battery 300 and/or the mobile platform 200. Exemplary abnormal battery status can include an abnormally high temperature, an abnormally high current, an abnormally low voltage, a short circuit, and/or an overcharging of the battery 300. The onboard BMS 220 can determine existence of the abnormal battery status using any predetermined criteria. Exemplary criteria can be at least partially based on specification of the battery 300. In one example, the initial battery data 320 (shown in FIG. 8) can include such specification. In another example, such specification can be stored and/or indexed on the onboard BMS 220, so the onboard BMS 220 can retrieve the specification according to the identification of the battery 300.

Figure 11:
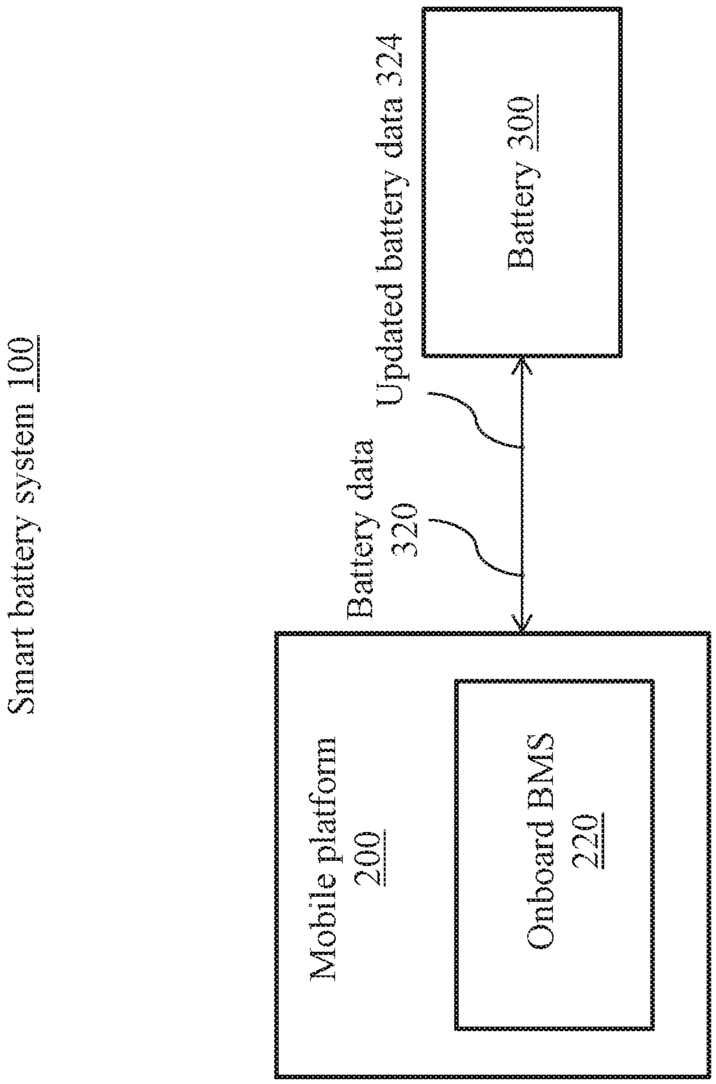
FIG. 11 is another exemplary diagram illustrating an embodiment of a smart battery system in accordance with the smart battery system of FIG. 1.

Turning to FIG. 11, updated battery data 324 is shown as being received from the onboard BMS 220 at the battery 300. The updated battery data 324 can include the battery data 320 that are updated (and/or refreshed) by the onboard BMS 220. For example, during discharging of the battery 300, the onboard BMS 220 can monitor and/or determine updated status of the battery 300 and generate the updated battery data 324 accordingly. Exemplary updated battery data 324 can include the current capacity, maximum capacity, voltage, current, internal resistance, temperature, number of charge-discharge cycles, and/or remaining lifetime of the battery 300.

The onboard BMS 220 can transmit the updated battery data 324 to the battery 300 for the updated battery data 324 to be stored on the battery 300. The onboard BMS 220 can transmit the updated battery data 324 to the battery 300 in any suitable manner. In one embodiment, the onboard BMS 220 can transmit the updated battery data 324 to the battery 300 at a predetermined and/or dynamically-variable frequency. In another embodiment, the onboard BMS 220 can transmit the updated battery data 324 to the battery 300 in real time, so the battery 300 can advantageously receive the updated battery data 324 in a timely manner.

Figure 12:
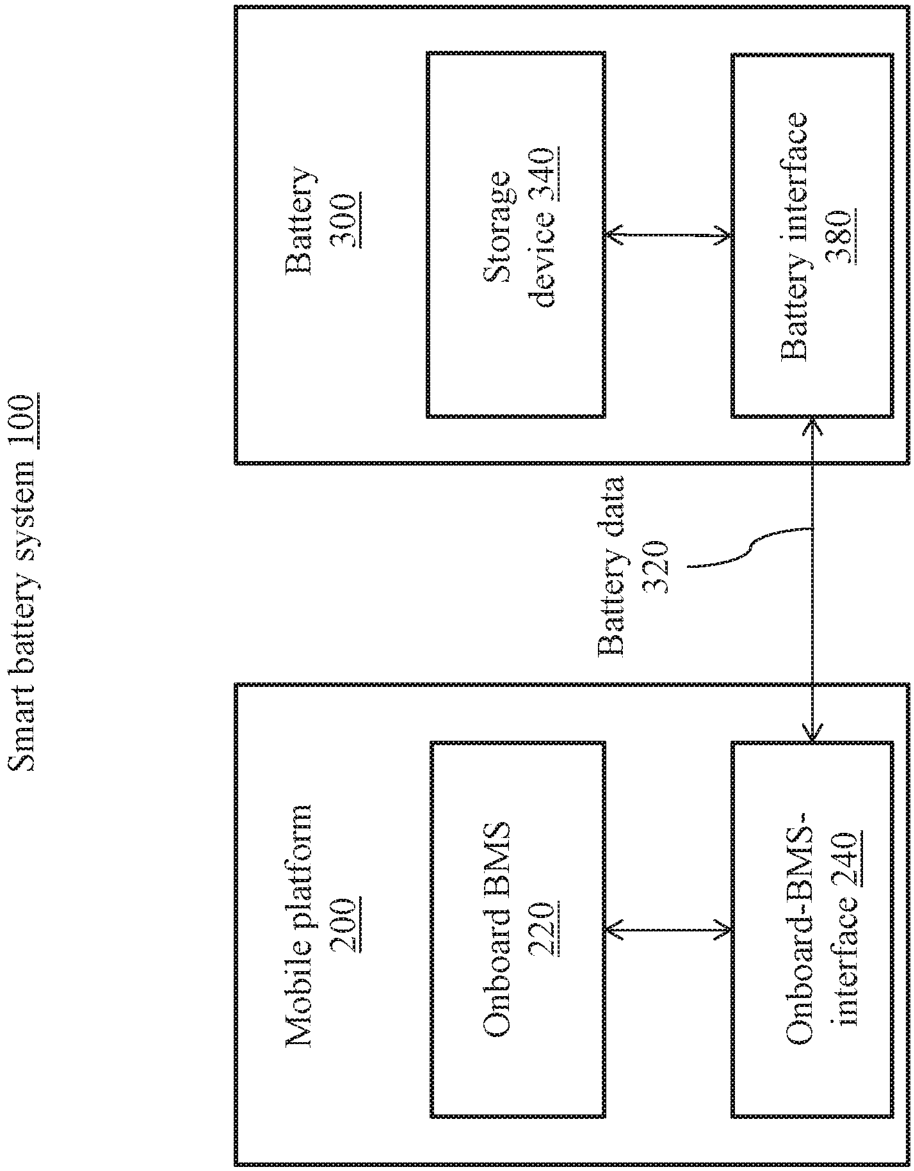
FIG. 12 is yet another exemplary diagram illustrating an embodiment of a smart battery system in accordance with the smart battery system of FIG. 1.

Turning to FIG. 12, the mobile platform 200 is shown as being placed in communication with the battery 300. In various embodiments, the mobile platform 200 can be placed in communication with the battery 300 prior to discharging the battery 300. As illustratively shown in FIG. 12, the battery 300 can include a battery interface 380 in communication with the storage device 340.

The exemplary battery interface 380 can include universal serial bus (USB), digital visual interface (DVI), display port, serial ATA (SATA), IEEE 1394 interface (also known as FireWire), serial, video graphics array (VGA), super video graphics array (SVGA), small computer system interface (SCSI), high-definition multimedia interface (HDMI), audio ports, parallel communication interface, series communication interface, differential communication interface, analog interface (to collecting analog data for analog/digital conversion), and/or proprietary input/output interfaces. The battery interface 380 can operate as a channel to transmit the battery data 320 between the battery 300 and the mobile platform 200. The battery interface 380 can include an electrical connection for coupling the battery 300 with the mobile platform 200 to discharge the battery 300.

FIG. 12 shows the mobile platform 200 as including an onboard-BMS-interface 240 in communication with the onboard BMS 220. The onboard-BMS-interface 240 can be provided in a similar manner as the battery interface 380. The onboard-BMS-interface 240 can operate as a channel for the battery data 320 to be transmitted between the mobile platform 200 and the battery 300. Additionally and/or alternatively, the onboard-BMS-interface 240 can include an electrical connection for coupling the mobile platform 200 with the battery 300 to discharge the battery 300.

As shown in FIG. 12, the battery interface 380 can be connected with the onboard-BMS-interface 240. In one embodiment, the battery interface 380 can be connected with the onboard-BMS-interface 240 physically and/or in wired manner. For example, the battery interface 380 can be connected with the onboard-BMS-interface 240 interface using a serial port, a parallel port, or a combination thereof.

In another embodiment, the battery interface 380 can be connected with the onboard-BMS-interface 240 remotely and/or wirelessly. Exemplary wireless methods can include radio, Wireless Fidelity (WiFi), cellular, satellite, and/or broadcasting. For example, the battery interface 380 can be connected with the onboard-BMS-interface 240 interface using Bluetooth, WiFi, near field communication (NFC), or a combination thereof.

Figure 13:
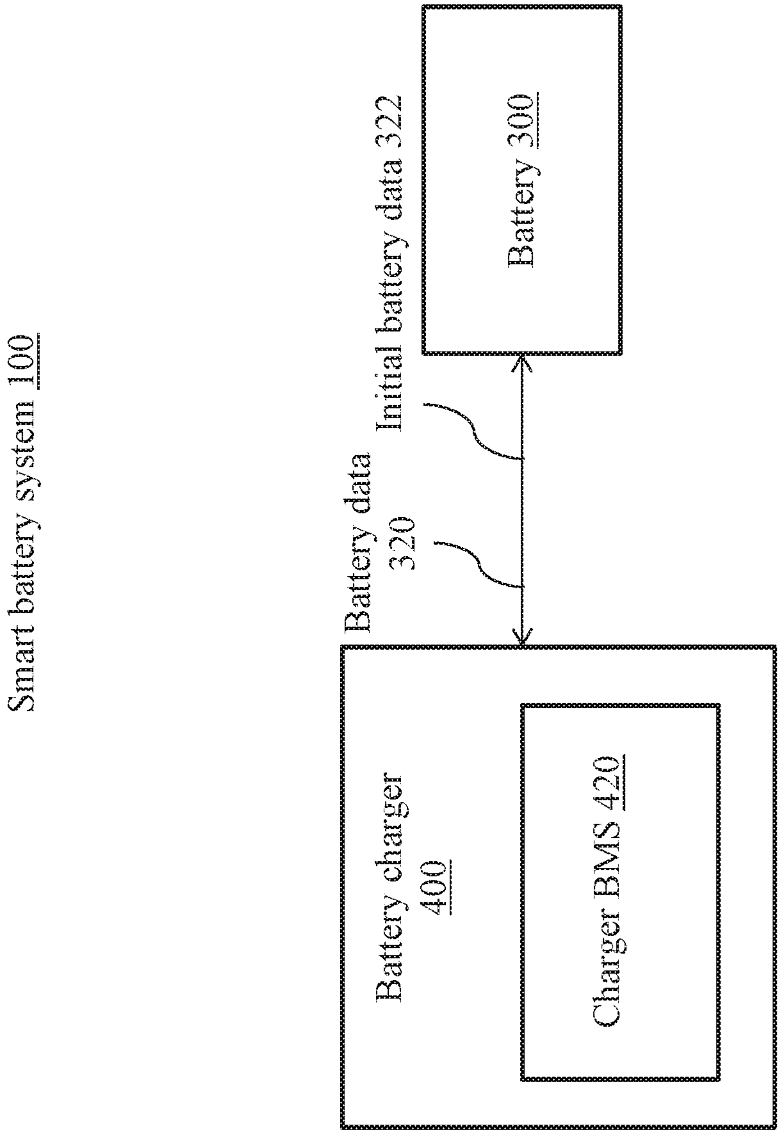
FIG. 13 is yet another exemplary diagram illustrating an embodiment of a smart battery system in accordance with the smart battery system of FIG. 1.

Turning to FIG. 13, the battery 300 is shown as transmitting the initial battery data 322 to the battery charger 400. The battery 300 can transmit the initial battery data 320 to the charger BMS 420. The charger BMS 420 can use the initial battery data 320 for identifying the battery 300 and/or assessing status of the battery 300.

When the battery 300 is in communication with the battery charger 400 during the charging, the detector 130 (shown in FIG. 9) of the battery 300 can be in communication with the charger BMS 420. Upon being instructed by the charger BMS 420, the detector 130 can collect the status of the battery 300 and transmit the same to the charger BMS 420. Based on the status of the battery 300 collected by the detector 130, the charger BMS 420 can perform any calculation needed for obtain the status of the battery 300. Thus, the charger BMS 420 can monitor the status of the battery 300 during the charging.

Optionally, the detector 130 can be at least partially located on the battery charger 400 and/or integrated with the charger BMS 420. In that case, the detector 130 can measure certain parameters (such as current and/or voltage) via electrical connection with the battery 300 when the battery 300 is coupled with the battery charger 400.

Figure 14:
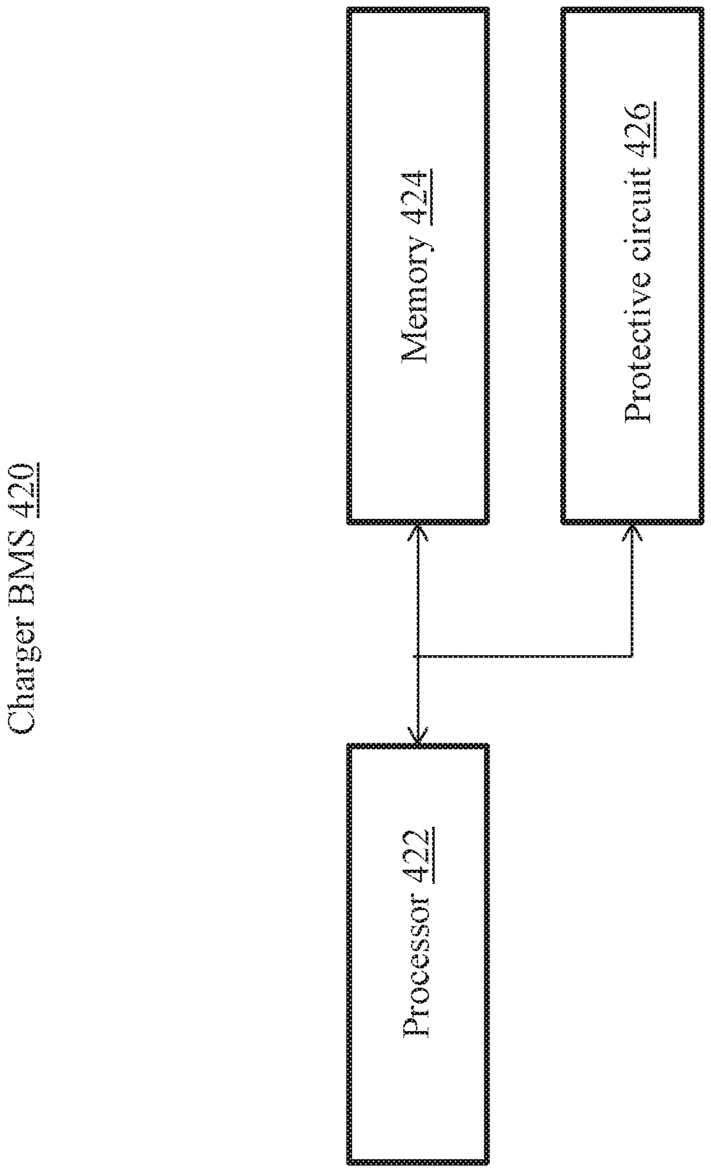
FIG. 14 is exemplary diagram illustrating an embodiment of the charger BMS of FIG. 6, wherein the charger BMS includes a protective circuit.

Turning to FIG. 14, the charger BMS 420 is shown as including a protective circuit 426 in communication with the processor 622. In some embodiments, the protective circuit 426 can be at least partially integrated with the processor 622. Exemplary protective circuit 426 can include one or more switch devices (not shown) triggered by control signals (not shown) from the processor 422.

The protective circuit 426 can protect the battery 300 during the charging upon detection of an abnormal battery status. Upon detection of the abnormal battery status of the battery modules 360 (shown in FIG. 4) and/or the battery cells 362 (shown in FIG. 4), the protective circuit 426 can selectively disconnect power input from the battery module 360, the battery cell 362, and/or the battery 300. Advantageously, safety of charging the battery 300 can be improved.

The charger BMS 420 can determine existence of the abnormal battery status using any predetermined criteria. Exemplary criteria can be at least partially based on specification of the battery 300. In one example, the initial battery data 320 (shown in FIG. 13) can include such specification. In another example, such specification can be stored on the charger BMS 420, so the charger BMS 420 can retrieve the specification according to the identification of the battery 300.

Additionally and/or alternatively, the charger BMS 420 can be configured to balance the battery 300 during the charging. In one embodiment, balancing the battery 300 can include balancing the battery cells 362 within one battery module 360 and/or balancing the battery cells 362 across different battery modules 360. In another embodiment, balancing the battery 300 can include balancing the battery modules 360.

Figure 15:
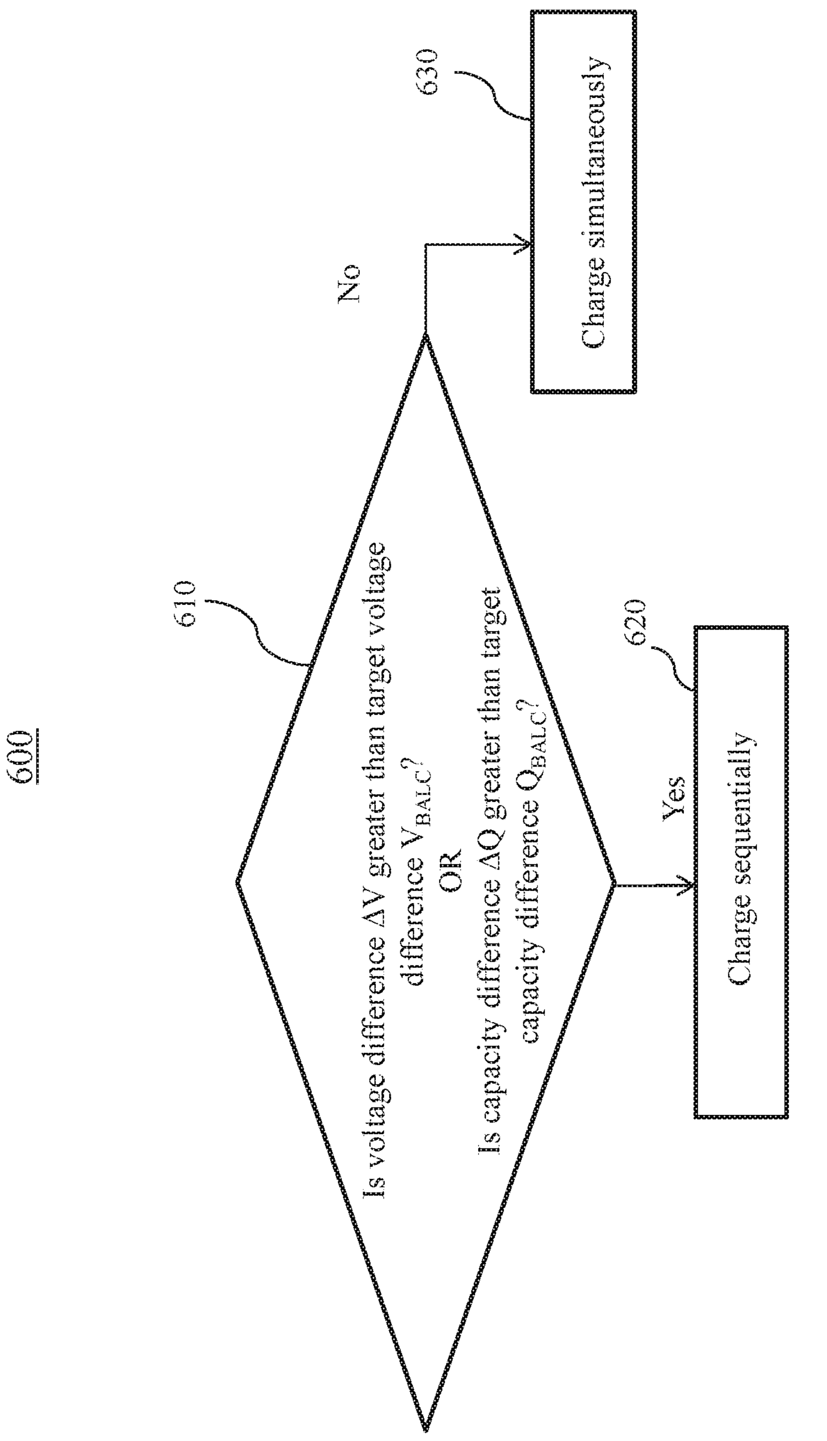
FIG. 15 is exemplary decision flow chart illustrating an embodiment of the method of FIG. 7 for managing the smart battery systems described herein

The charger BMS 420 can be configured to balance the battery cells 362 in any suitable and/or customized manner. FIG. 15 shows an exemplary flow chart of a method 600 for balancing the battery 300 (shown in FIG. 4) during the charging. A voltage difference ΔV between two battery cells 362 (shown in FIG. 4) can be compared, at 610, with a target voltage difference $V_{BALC}$. Additionally and/or alternatively, a capacity difference ΔQ between two battery cells 362 can be compared with a target capacity difference $Q_{BALC}$. When at least one of the following conditions is met:

$$\Delta V > V_{BALC}; \text{ and} \qquad \text{Equation (1)}$$

$$\Delta Q > Q_{BALC}, \qquad \text{Equation (2)}$$

the battery cells 362 can be charged sequentially, at 920. Stated somewhat differently, the charger BMS 420 (shown in FIG. 2) can charge the battery cells 362 having a lower voltage and/or capacity prior to charging other battery cells 362. When the voltage difference ΔV is not greater than the target voltage difference $V_{BALC}$, and the capacity difference ΔQ is not greater than the target capacity difference $Q_{BALC}$, that is:

$$\Delta V \le V_{BALC}; \text{ and} \qquad \text{Equation (3)}$$

$$\Delta Q \le Q_{BALC}, \qquad \text{Equation (4)}$$

the battery cells 362 can be charged simultaneously, at 630.

The method 600 can be implemented on selected battery cells 362 or all battery cells 362 to determine the order of charging. Stated somewhat differently, based on the method 600, the charger BMS 420 can first charge battery cells 362 having the lowest voltages and/or capacities. When the voltages and/or capacities increase due to the discharging, battery cells 362 having the second lowest voltages and/or capacities can join the charging. At the last stage of charging, the battery cells 362 of highest voltage and/or capacities can join the charging. Thus, after the charging, voltage and/or capacity difference between at least some of the battery cells 362 can be small. The charging can thus balance the battery cells 362.

Similarly, method 600 can be implemented similarly for balancing between battery modules 360 (shown in FIG. 4). Values of the target voltage difference $V_{BALC}$ and/or the target capacity difference $Q_{BALC}$ can be predetermined accordingly based on whether comparison is between the battery cells 362 or between the battery modules 360.

Thus, the charger BMS 420 can optimize charging of the battery 300 based on any selected customized criteria. In contrast, a conventional charger typically charges a smart battery without intelligent charging function. That is, all battery cells are charged simultaneously. Weak batteries battery cells are likely to be over-charged. The higher voltage of weak battery cells at charge completion can lead to accelerated capacity degradation. Weak battery cells can be weakened further by continuous overcharge cycles. By using method 600, weak battery cells 362 can be balanced with other battery cells 362 at full charge termination. Over-charge damage can be advantageously prevented. Longevity of the battery 300 can thus be increased.

Figure 16:
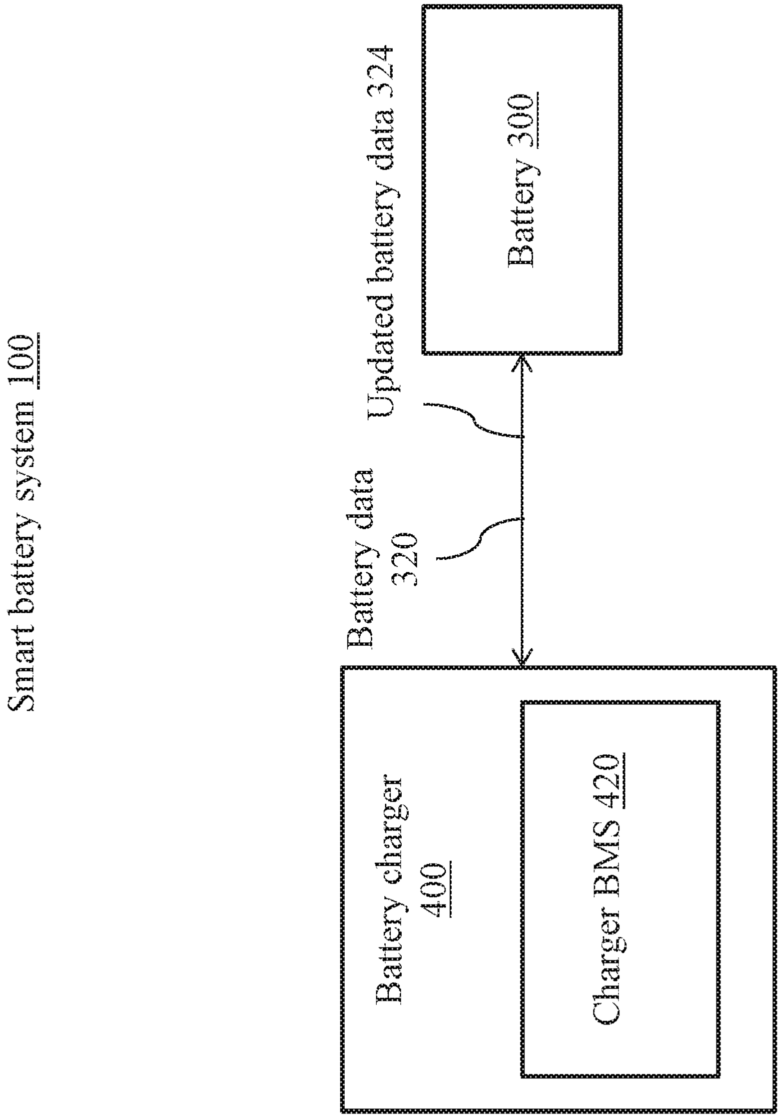
FIG. 16 is yet another exemplary diagram illustrating an embodiment of a smart battery system in accordance with the smart battery system of FIG. 1.

FIG. 16 illustrates updated battery data 324 as being received from the charger BMS 420 at the battery 300. The updated battery data 324 can include the battery data 320 that are updated by the charger BMS 420. For example, during charging of the battery 300, the charger BMS 420 can monitor and/or determine updated status of the battery 300 and generate the updated battery data 324 accordingly.

The charger BMS 420 can transmit the updated battery data 324 to the battery 300 for the updated battery data 324 to be stored on the battery 300. The charger BMS 420 can transmit the updated battery data 324 to the battery 300 in any suitable manner. In one embodiment, the charger BMS 420 can transmit the updated battery data 324 to the battery 300 at a predetermined and/or dynamically-variable frequency. In another embodiment, the charger BMS 420 can transmit the updated battery data 324 to the battery 300 in real time, so the battery 300 can advantageously receive the updated battery data 324 in a timely manner.

Figure 17:
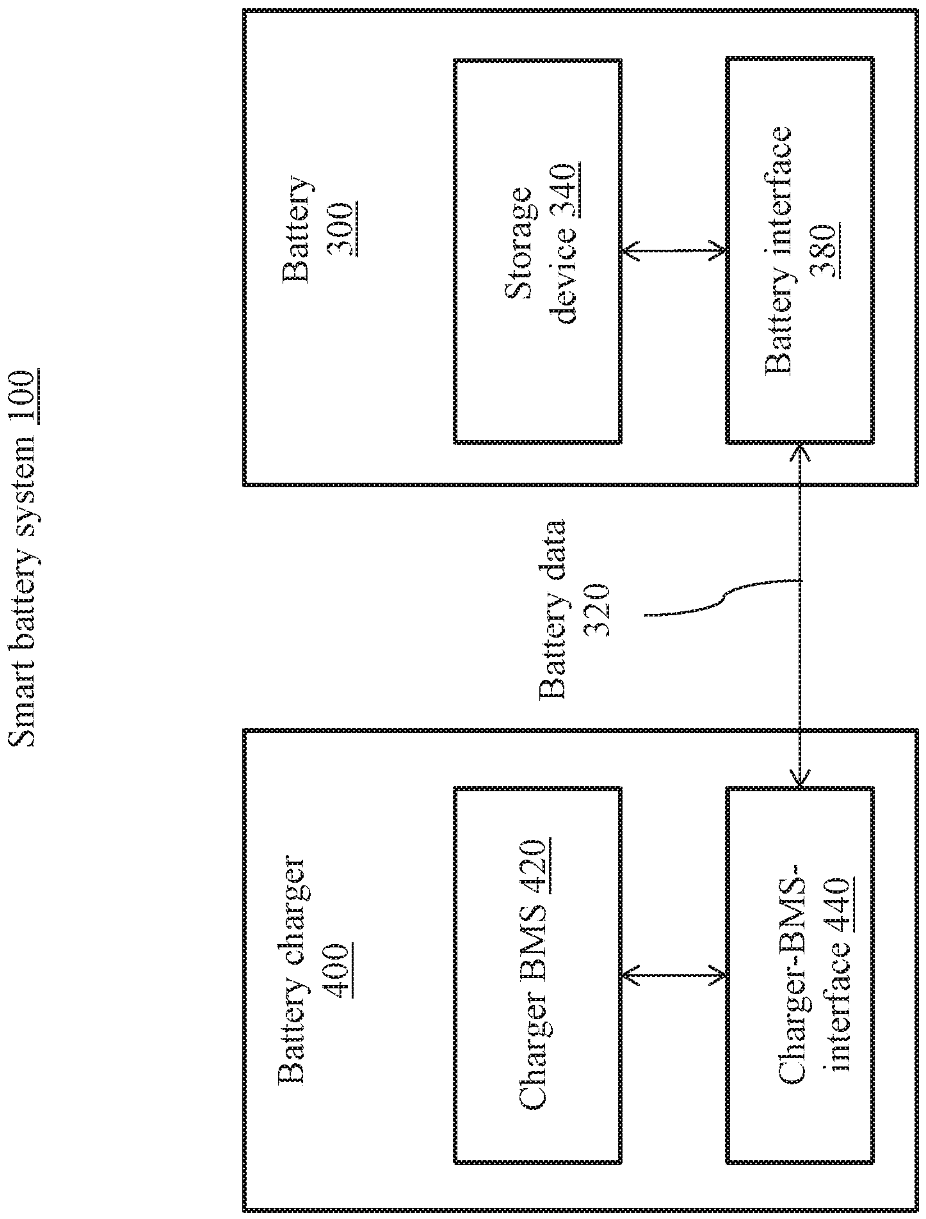
FIG. 17 is yet another exemplary diagram illustrating an embodiment of a smart battery system in accordance with the smart battery system of FIG. 1.

Turning to FIG. 17, the battery charger 400 is shown as being placed in communication with the battery 300. In various embodiments, the battery charger 400 can be placed in communication with the battery 300 prior to charging the battery 300. As illustratively shown in FIG. 17, the battery 300 can include the battery interface 380 in communication with the storage device 340. The battery interface 380 can operate as a channel for the battery data 320 to transmit between the battery 300 and the battery charger 400. Additionally and/or alternatively, the battery interface 380 can include an electrical connection for coupling the battery 300 with the battery charger 400 to charge the battery 300.

FIG. 17 shows the battery charger 400 as including a charger-BMS-interface 440 in communication with the charger BMS 420. The charger-BMS-interface 440 can be provided in a similar manner as the onboard-BMS-interface 240 (shown in FIG. 12). The charger-BMS-interface 440 can operate as a channel for the battery data 320 to transmit between the battery charger 400 and the battery 300. Additionally and/or alternatively, the charger-BMS-interface 440 can include an electrical connection for coupling the battery charger 400 with the battery 300 to charge the battery 300.

As shown in FIG. 17, the battery interface 380 can be connected with the charger-BMS-interface 440. In one embodiment, the battery interface 380 can be connected with the charger-BMS-interface 440 physically and/or in wired manner. For example, the battery interface 380 can be connected with the charger-BMS-interface 440 interface using a serial port, a parallel port, or a combination thereof.

In one embodiment, the battery interface 380 can be connected with the charger-BMS-interface 440 remotely and/or wirelessly. Exemplary methods for wireless connection can include radio, Wireless Fidelity (WiFi), cellular, satellite, and/or broadcasting. For example, the battery interface 380 can be connected with the charger-BMS-interface 440 interface using Bluetooth, WiFi, near field communication (NFC), or a combination thereof.

Figure 18:
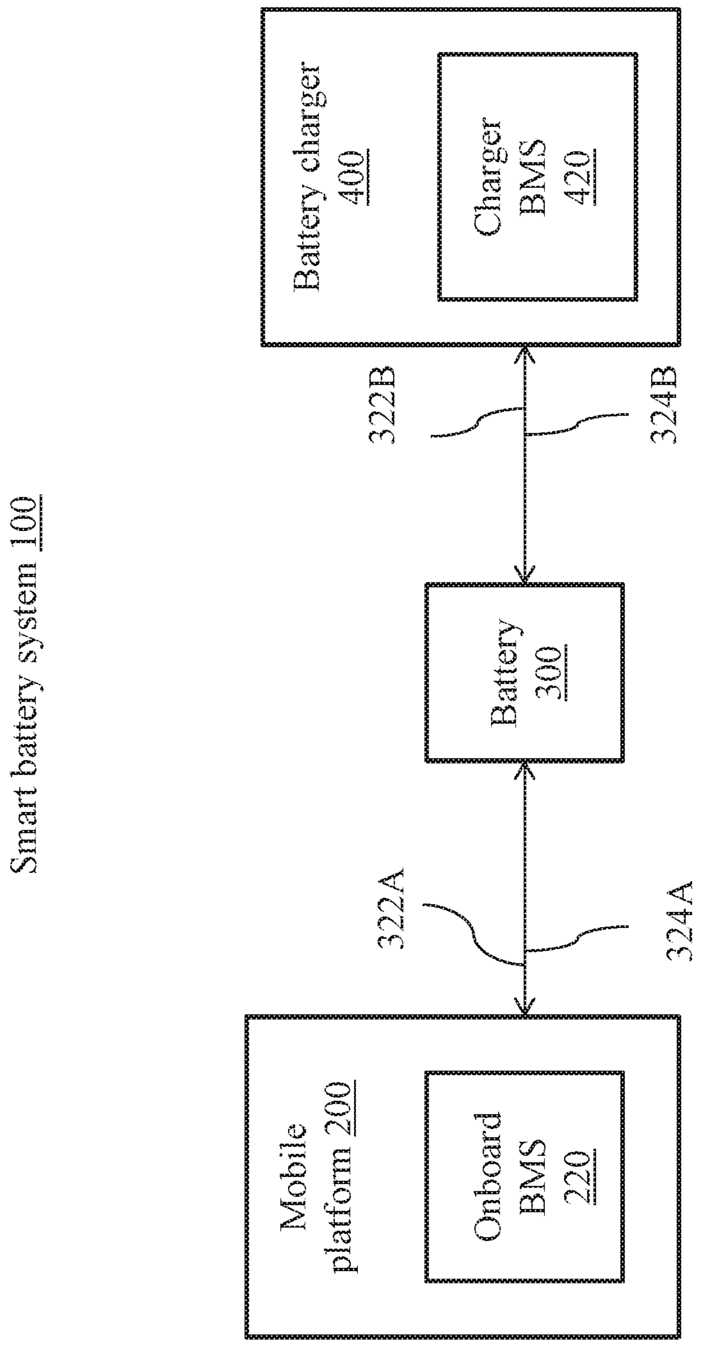
FIG. 18 is yet another exemplary diagram illustrating an embodiment of a smart battery system in accordance with the smart battery system of FIG. 1.

Turning to FIG. 18, another alternative embodiment of the smart battery system 100 is shown. FIG. 18 shows the smart battery system 100 as including the mobile platform 200 and the battery charger 400. At least one of the mobile platform 200 and the battery charger 400 can be coupled with the battery 300. The battery 300 can transmit the initial battery data 322 to the mobile platform 200 and/or the battery charger 400. The initial battery data 322 can include first initial battery data 322A transmitted to the mobile platform 200 and/or second initial battery data 322B transmitted to the battery charger 400.

As shown in FIG. 18, the battery 300 can receive the updated battery data 324 from the mobile platform 200 and/or the battery charger 400. The updated battery data 324 can include first updated battery data 324A received from the mobile platform 200 and/or second updated battery data 324B received from the battery charger 400.

Although FIG. 18 shows both of the mobile platform 200 and the battery charger 400 being coupled with the battery 300 for illustrative purposes only, the mobile platform 200 and the battery charger 400 can be coupled with the battery 300 simultaneously and/or sequentially. The battery 300 can transmit the first initial battery data 322A and/or the second initial battery data 322B simultaneously and/or sequentially. The battery 300 can receive the first updated battery data 324A and/or the second updated battery data 324B simultaneously and/or sequentially.

Figure 19:
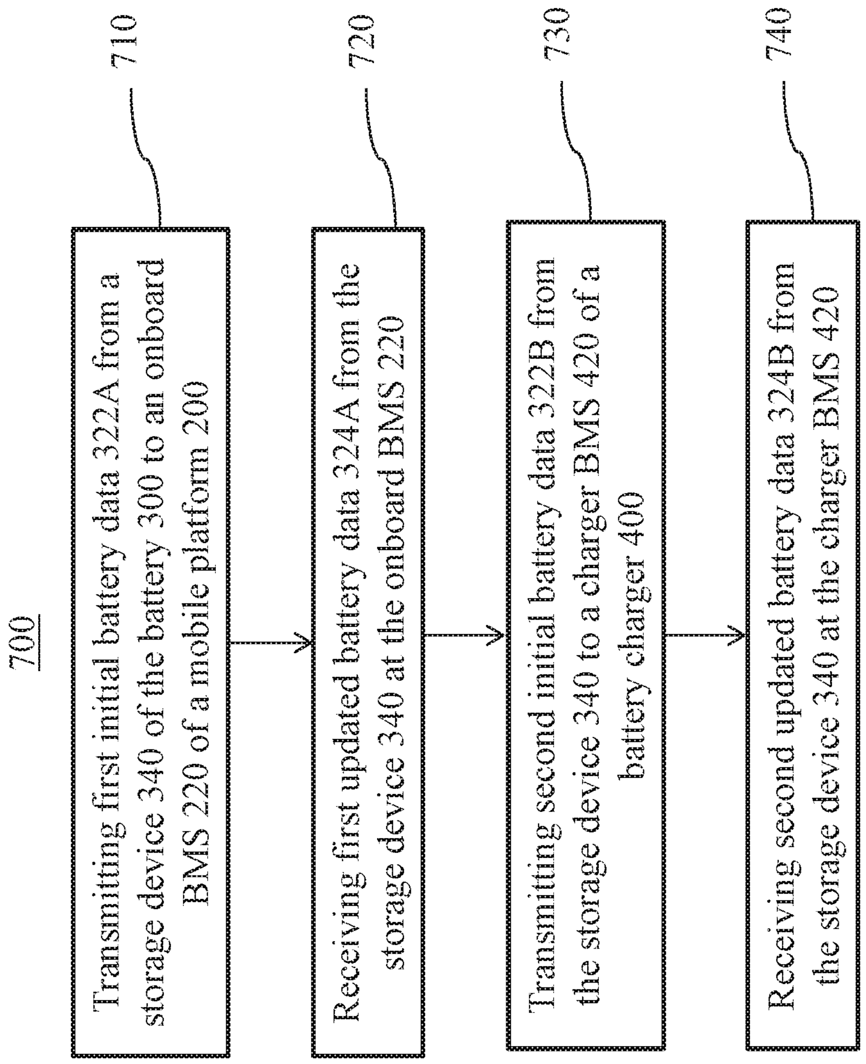
FIG. 19 is an exemplary flow chart illustrating another embodiment of the method of FIG. 7 for managing the smart battery systems described herein It should be noted that the figures are not drawn to scale and that elements of similar structures or functions are generally represented by like reference numerals for illustrative purposes throughout the figures. It also should be noted that the figures are only intended to facilitate the description of the embodiments. The figures do not illustrate every aspect of the described embodiments and do not limit the scope of the present disclosure.

Turning to FIG. 19, an exemplary method 700 for managing the battery 300 is shown. The method 700 can be implemented by the battery 300. As shown in FIG. 19, the first initial battery data 322A are transmitted, at 710, from the storage device 340 of the battery 300 to the onboard BMS 220 of the mobile platform 200. The first initial battery data 322A can be transmitted in a similar manner as transmitting of the initial battery data 320 as shown in FIG. 8. The first updated battery data 324A are received, at 720, from the onboard BMS 220 at the storage device 340. The first updated battery data 324A can be received in a similar manner as transmitting of the updated battery data 324 as shown in FIG. 11. The second initial battery data 322B are transmitted, at 730, from the storage device 340 to the charger BMS 420 of the battery charger 400. The second initial battery data 322B can be transmitted in a similar manner as transmitting of the initial battery data 320 shown in FIG. 13. The second updated battery data 324B are received, at 740, from the charger BMS 420 at the storage device 340. The second updated battery data 324B can be received in a similar manner as transmitting of the updated battery data 324 as shown in FIG. 16.

Although FIG. 19 shows 710 and 720 as being implemented prior to 730 and 740 for illustrative purposes only, 730 and/or 740 can be implemented prior to, and/or simultaneously with, 710 and/or 720, without limitation. For example, the battery 300 can first be connected with the battery charger 400 for charging, by implementing 730 and/or 740. The charged battery 300 can then be connected with the mobile platform 200 to power the mobile platform 200, by implementing 710 and/or 720.

The disclosed embodiments are susceptible to various modifications and alternative forms, and specific examples thereof have been shown by way of example in the drawings and are herein described in detail. It should be understood, however, that the disclosed embodiments are not to be limited to the particular forms or methods disclosed, but to the contrary, the disclosed embodiments are to cover all modifications, equivalents, and alternatives.

What is claimed is:

1. A method for managing a battery, comprising:

exchanging battery data between the battery and a mobile platform and between the battery and of a battery charger, including, at the battery, receiving, in a sequential manner or in a parallel manner, first updated battery data from an onboard battery management system (BMS) of the mobile platform and second updated battery data from a charger BMS of the battery charger, the onboard BMS being configured to monitor a first status of the battery and generate the first updated battery data, and the charger BMS being configured to monitor a second status of the battery and generate the second updated battery data; and managing the battery based on the first updated battery data and the second updated battery data;

wherein the charger BMS is configured to:

compare a voltage difference between two battery cells of the battery with a target voltage difference;

in response to the voltage difference being greater than the target voltage difference, charge the two battery cells sequentially; and in response to the voltage difference being no greater than the target voltage difference, charge the two battery cells simultaneously.

2. The method of claim 1, wherein managing the battery comprises managing discharging of the battery using the onboard BMS of the mobile platform.

3. The method of claim 2, wherein exchanging the battery data comprises transmitting initial battery data from the battery to the onboard BMS of the mobile platform, the initial battery data comprising at least one of a unique identifier, serial number, model number, manufacturer, manufacture date, current capacity, maximum capacity, voltage, current, internal resistance, temperature, number of charge-discharge cycles, or remaining lifetime of the battery.

4. The method of claim 2, wherein managing the discharging comprises:

monitoring, through the onboard BMS of the mobile platform, at least one of a current capacity, maximum capacity, voltage, current, internal resistance, temperature, or remaining lifetime of the battery during the discharging; or protecting the battery during the discharging upon detection of an abnormal battery status comprising at least one of an abnormally high temperature, an abnormally high current, an abnormally low voltage, a short circuit, or an overcharging of the battery.

5. The method of claim 2, further comprising placing the battery in communication with the onboard BMS prior to discharging the battery.

6. The method of claim 5, wherein placing the battery in communication with the onboard BMS comprises connecting a battery-interface of the battery with an onboard-BMS-interface of the mobile platform.

7. The method of claim 6, wherein connecting the battery-interface with the onboard-BMS-interface comprises:

physically connecting the battery-interface with the onboard-BMS-interface using at least one of a serial port or a parallel port; or remotely connecting the battery-interface with the onboard-BMS-interface using at least one of Bluetooth, WiFi, or NFC.

8. The method of claim 1, wherein managing the battery comprises managing charging of the battery using the charger BMS of the battery charger.

9. The method of claim 8, wherein exchanging the battery data comprises transmitting initial battery data from the battery to the charger BMS of the battery charger, the initial battery data comprising at least one of a unique identifier, serial number, model number, manufacturer, manufacture date, current capacity, maximum capacity, voltage, current, internal resistance, temperature, number of charge-discharge cycles, or remaining lifetime of the battery.

10. The method of claim 8, wherein managing the charging comprises:

monitoring, through the charger BMS of the battery charger, at least one of a current capacity, maximum capacity, voltage, current, internal resistance, temperature, or remaining lifetime of the battery during the charging; or protecting the battery during the charging upon detection of an abnormal battery status comprising at least one of an abnormally high temperature, an abnormally high current, an abnormally low voltage, a short circuit, or an overcharging of the battery.

11. The method of claim 8, further comprising placing the battery in communication with the charger BMS prior to charging the battery.

12. The method of claim 11, wherein placing the battery in communication with the charger BMS comprises connecting a battery-interface of the battery with a charger-BMS-interface of the charger.

13. The method of claim 12, wherein connecting the battery-interface with the charger-BMS-interface comprises:

physically connecting the battery-interface with the charger-BMS-interface using at least one of a serial port or a parallel port; or remotely connecting the battery-interface with the charger-BMS-interface using at least one of Bluetooth, WiFi, or NFC.

14. The method of claim 8, wherein:

the battery comprises one or more battery modules each comprising a plurality of battery cells; and managing the charging of the battery comprises balancing the battery cells in each of the one or more battery modules during the charging.

15. The method of claim 14, wherein managing the charging comprises balancing the one or more battery modules during the charging.

16. The method of claim 1, wherein the mobile platform is an unmanned aerial vehicle (UAV).

17. A system for managing charging and discharging of a battery, comprising:

a mobile platform comprising an onboard battery management system (BMS); and a battery charger comprising a charger BMS, wherein:

the onboard BMS and the charger BMS are configured to:

exchange battery data with the battery, including, at the battery, sending, in a sequential manner or in a parallel manner, first updated battery data by the onboard BMS and second updated battery data by the charger BMS, the onboard BMS being configured to monitor a first status of the battery and generate the first updated battery data, and the charger BMS being configured to monitor a second status of the battery and generate the second updated battery data; and manage the battery based on the first updated battery data and the second updated battery data; and the charger BMS is configured to:

compare a voltage difference between two battery cells of the battery with a target voltage difference;

in response to the voltage difference being greater than the target voltage difference, charge the two battery cells sequentially; and in response to the voltage difference being no greater than the target voltage difference, charge the two battery cells simultaneously.

18. The system of claim 17, wherein:

the onboard BMS of the mobile platform operates to manage discharging of the battery; and the charger BMS of the battery charger operates to manage charging of the battery.

* * * * *